United States Patent [19]

Jepsen

[11] Patent Number: 4,758,207

[45] Date of Patent: Jul. 19, 1988

[54] CHAIN TENSIONING DEVICE

[76] Inventor: Kurt F. Jepsen, 4000 Düsseldorf 31, Am Gentenberg 103, Fed. Rep. of Germany

[21] Appl. No.: 935,285

[22] Filed: Nov. 26, 1986

[30] Foreign Application Priority Data

Aug. 12, 1986 [DE] Fed. Rep. of Germany ....... 3627373

[51] Int. Cl.⁴ .............................................. F16H 7/08
[52] U.S. Cl. ..................................... 474/101; 474/138
[58] Field of Search ............... 474/101, 109, 111, 136, 474/138

[56] References Cited

U.S. PATENT DOCUMENTS 1,374,643  4/1921  Fischbach ........................... 474/138
4,425,103  1/1984  Foster ................................. 474/138

Primary Examiner—Stephen J. Novosad
Assistant Examiner—Thuy M. Bui
Attorney, Agent, or Firm—Robert A. Brown

[57] ABSTRACT

A chain tensioning device for chain and belt drives, comprising a tensioning head resiliently connected to a base and provided with a non-return device, wherein at least one pneumatic spring extends between the base and the tensioning head.

11 Claims, 3 Drawing Sheets

Fig. 4
Fig. 3
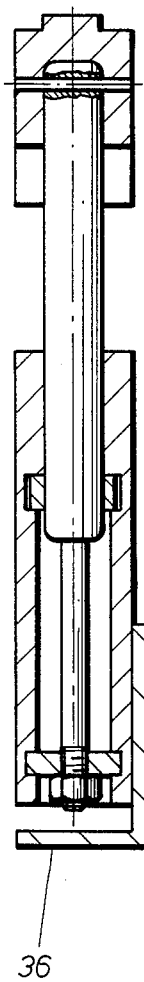
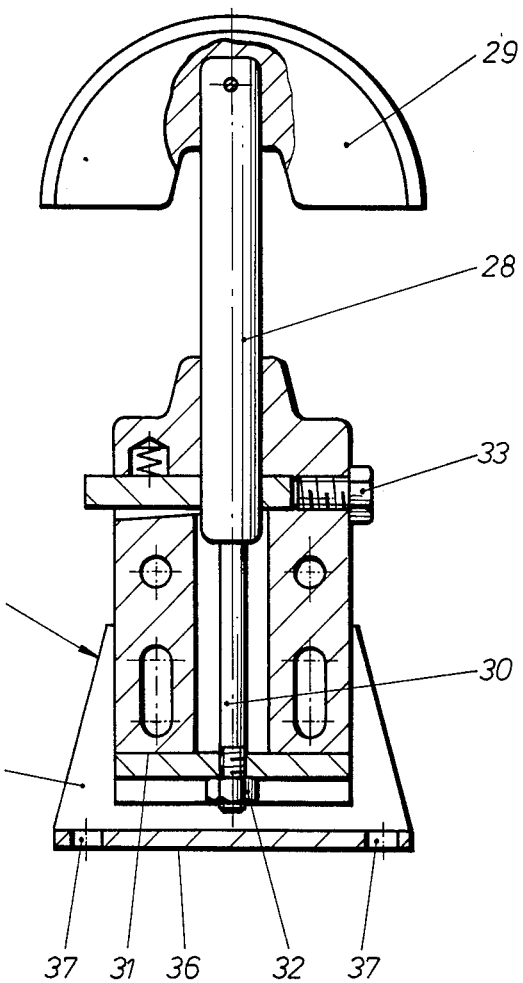

CHAIN TENSIONING DEVICE

TECHNICAL FIELD OF THE INVENTION

The invention relates to a chain tensioning device for chain and belt drives, comprising a tensioning head resiliently connected to a base.

BACKGROUND OF THE INVENTION AND PRIOR ART

A chain tensioning device of this kind, known from German Utility Model specification No. 78 09 294, has a tensioning head subjected to the pressure of three cylindrical springs arranged in its interior. The springs can be locked individually by means of screws, and a housing serves as a guide for the tensioning head. The pressure exerted on the chain by this chain tensioning device is not uniform over its whole range of movement, since the resilient pressure decreases as the extension increases; its guides can become dirtied and finally blocked if dirt gets into the guide housing; and above all a tensioning device of this kind, and thus also the chain, is caused to oscillate if a shock force acts on the chain.

OBJECT OF THE INVENTION

The object of the invention is to provide a chain tensioning device which avoids the disadvantages of known chain tensioning devices, and in particular also prevents the chain from oscillating on shock loading.

SUMMARY OF THE INVENTION

This problem is solved, according to the invention, by providing the tensioning head with a non-return device. The tensioning head, which may for example be in the form of a roller or a segment of a circle, is thereby prevented from moving opposite to its direction of action and from yielding to a force, particularly to a shock force, directed opposite to its direction of action. In this way oscillation of the chain caused by shock loading is reliably prevented.

When the tensioning head is connected to the base by at least one guide pillar, soiling of the guide pillars can be substantially prevented, since dirt does not adhere so tightly to the cylindrical guide pillars and therefore does not get into the base. Hence there is no risk that the guide pillars will jam in the housing when they advance in the direction in which the tensioning head acts.

A non-return device that is economical to manufacture and easy to service can consist of a lever that has a through bore for a guide pillar and is moveable in a recess in the base opposite to the direction of the resilient force. When the tensioning head advances, the axis of the through bore is aligned with the axis of the guide pillar, so that the pillar can slide unhindered because it has a certain amount of play in the through bore in the lever. As soon as the forces in the chain and in the chain tensioning device are in equilibrium and the guide pillars have ceased to advance, the free end of the lever (in the case of a vertically acting chain tensioning device) sinks to some extent under its own weight, and the outwardly opening recess allows it to tilt against the guide pillar to an extent corresponding to the play present, since the pillar axis is inclined at a small angle to the axis of the through bore. So that the lever can also act as a non-return device in a horizontally acting chain tensioning device, a spring acting against the resilient pressure can extend between the lever and a face of the base. This spring can be very small in size, since it only has to withstand a small differential pressure.

To prevent the tensioning head from slipping unintentionally out of the base, each of the guide pillars can have a stop ring on its free end to limit the travel of the tensioning head. To remove the tensioning head from the base, it is only necessary to compress the chain tensioning device far enough for the free ends of the guide pillars carrying the stop rings to project from the body, and to remove the rings.

So that the chain device exerts a uniform force on the chain or belt, a pneumatic spring can extend between the base and the tensioning head, and can also serve as the only guide pillar. If the pneumatic spring is arranged midway between two guide pillars the resulting guidance is particularly advantageous for heavy chain tensioning devices. In addition, the counterpressure exerted on the tensioning head by the chain is then uniformly distributed between the two guide pillars insofar as the axes of symmetry of the tensioning head and the spring coincide.

To enable the chain tensioning device to be installed quickly and without trouble, the base can be removeably connected to an L-section mounting bracket, the arms of which extend laterally beyond the base.

BRIEF DESCRIPTION OF THE DRAWINGS

The invention will now be described in more detail with reference to an embodiment shown by way of example in the drawings, in which:

FIG. 3 shows a longitudinal axial section through a chain tensioning device having a pneumatic spring as guide pillar; and FIG. 4 shows an axial section through the chain tensioning device of FIG. 3.

DETAILED DESCRIPTION OF A PREFERRED EMBODIMENT OF THE INVENTION

Figure 1:
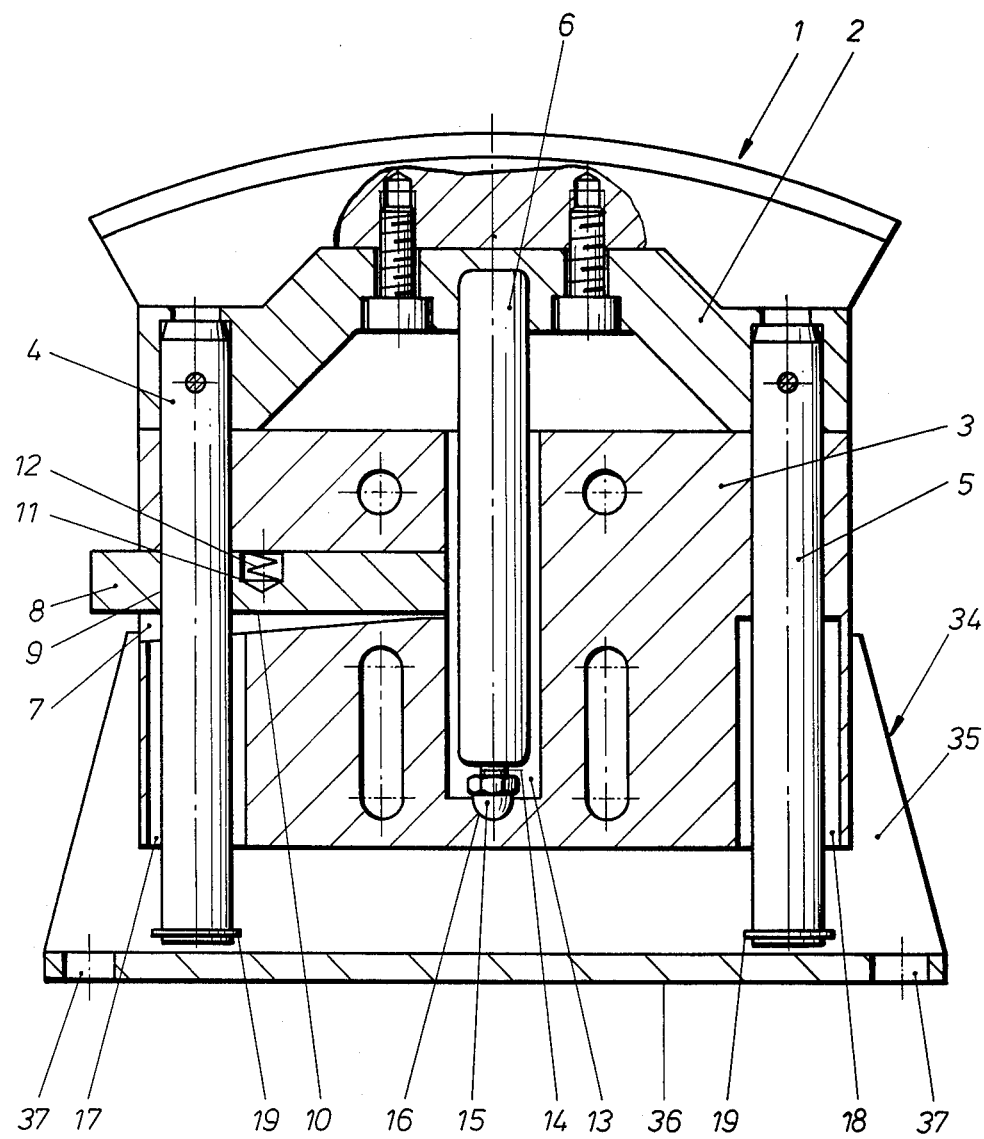
FIG. 1 shows a longitudinal section of a chain tensioning device according to the invention in the tensioned state.

The chain tensioning device 1 consists of a tensioning head 2, a base 3, guide pillars 4, 5 and a pneumatic spring 6 arranged midway between the guide pillars. The base 3 has a recess 7, widening towards the outside, for a prismatic lever 8 having a through bore 9 for the pillar 4 and a cylindrical recess 11 for a small spiral spring 12.

In the following description, spatial terms refer to a vertically acting chain tensioning device 1.

A cylindrical opening 13 for the pneumatic spring 6 arranged centrally in the base 3 and communicating with the recess 7, terminates in a hemispherical depression 16 that serves to receive a nut 15 screwed into the piston rod 14 of the pneumatic spring 6. Symmetrical with the opening 13 there are through bores 17, 18 in the base 3 for the pillars 4, 5. In their sections remote from the tensioning head 2 the diameter of the bores 17,18 corresponds to one of the pillars 4, 5: otherwise it corresponds to the external diameter of the stop rings 19.

Figure 2:
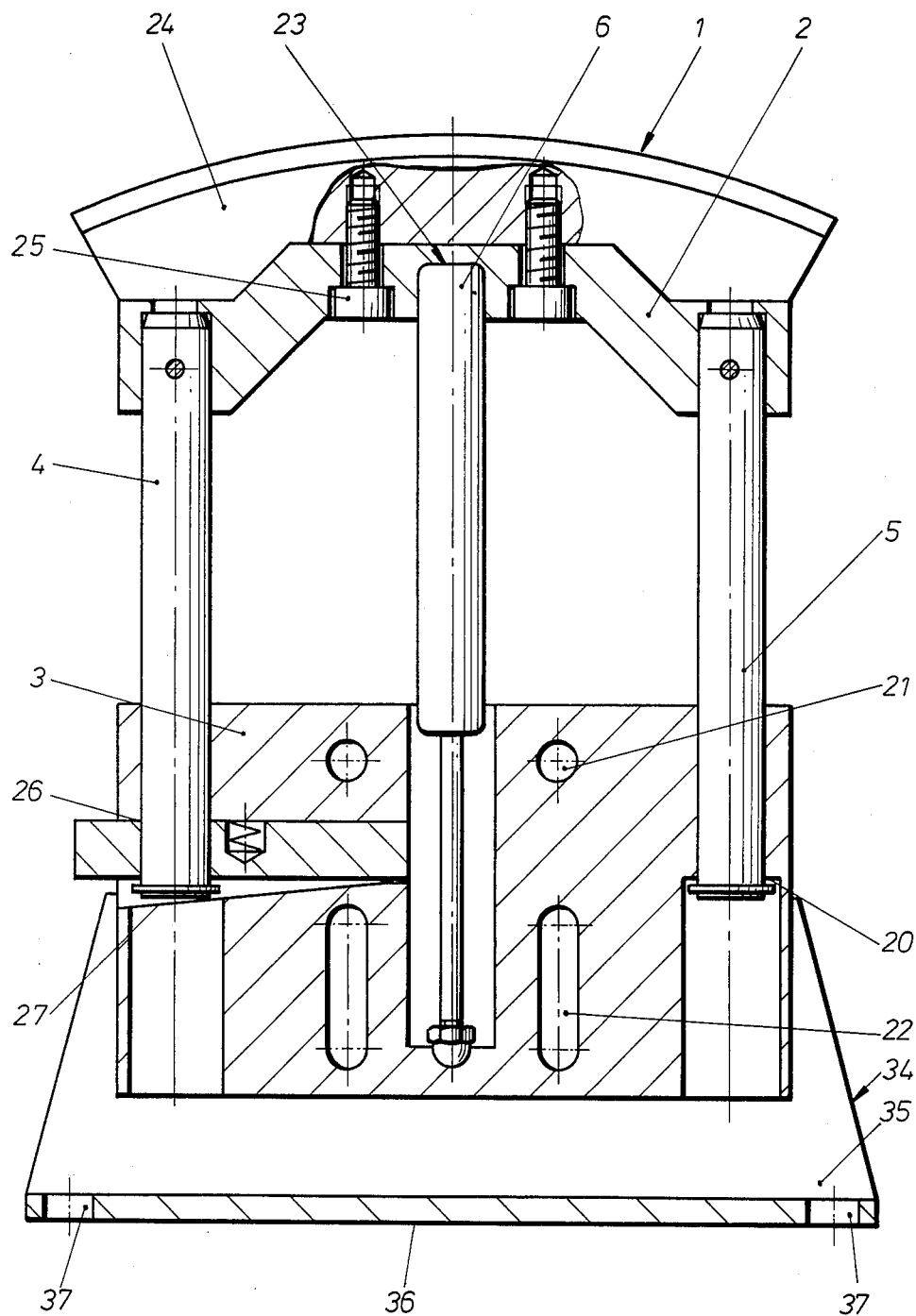
FIG. 2 shows the chain tensioning device according to FIG. 1 in its transport position.

In the bore 18 the annular face 20 formed by the abrupt transition from larger to smaller diameter lies in the same plane as the underside 10 of the lever 8. When the stop rings 19 contact the annular faces 10, 20, the pillars 4, 5 and the spring 6, after travelling the same distance, are safeguarded against further travel or against falling or being pulled out (FIG. 2).

In contrast to the bore 18, the smaller-diameter section of the bore 17 ends at a horizontal base face of the recess 7 and the larger-diameter section begins at an oblique face 27 of the same recess.

Transverse to the longitudinal bores 17,18, there are holes 21 and slots 22 in the base 3 for fixing screws (not shown).

The pillars 4, 5 are fixed firmly to the arcuate tensioning head 2, while the pneumatic spring 6 and its piston are removeably seated in a matching opening 23. A slipper 24 suitable for the application is removeably connected to the tensioning head 2 by screws 25.

The chain tensioning device 1, tensioned for example by means of a wooden block (not shown) jammed between the projecting free ends of the guide pillars 4, 5 or by locking screws acting on the pillars, is screwed to its mounting, and after, for example, a roller chain has been fitted it is released from the locking means. At that moment the pneumatic spring and the non-return devices 7, 8 become effective. The pneumatic spring 6 exerts on the chain a pressure that is constant over the whole travel and that tautens the chain until the stop rings 19 press against the underside 10 of the lever 8 or the annular face 20 of the bore 18 and prevent further relaxation of the pneumatic spring. From this time onwards the chain tensioning device 1 can only prevent further slackening of the chain if it is moved in the direction of action of its spring and is thus once again tensioned. After the pillars 4, 5 have advanced, the lever 8, under the influence of the small spring 12, presses against the pillar 4, since it tilts against the pillar 4 as far as the small amount of play between the bore 9 and pillar 4 permits: that is to say, the axes of the bores 9, 17 are no longer aligned. The lever 8 can tilt without hindrance, since it has enough play in the recess 7 and on tilting its underside 10 can move into the opening 13. However, when the pillar 4 advances the lever 8 lies up against the horizontal face 26 of the base, so that the axes of the bores 9, 17 are aligned and the pillar 4 can move without hindrance in the base 3 in the direction of action of the spring 6.

If a transient force, for example a blow, acts on the chain, the pneumatic spring cannot yield, since this is prevented by the tilted lever 8, so that oscillations of the chain cannot occur either.

Because of the advantageous distribution of forces—the pillars 4, 5 and the spring 6 support the tensioning head 2 uniformly along its whole length—and since the chain exerts a uniform pressure on the slipper (which is adapted to the line of the chain) and on the tensioning head 2, a single non-return device 7, 8 for one pillar will in general suffice. If this is not adequate to prevent vibrations of the chain resulting from shock loading, a further non-return device 7, 8 can also prevent the other pillar 5 from yielding against the direction of action of the spring.

The chain tensioning device 1 can also be provided with a pneumatic spring 28 that serves at the same time as a guide pillar and can have a hollow arcuate shaped slipper 29 that is connected directly to the pneumatic spring (FIGS. 3 and 4). The pneumatic spring 28 is guided in the base 3 of the chain tensioning device so that it can move axially but cannot rotate, so as to prevent the slipper from twisting. The piston rod 30 of the pneumatic spring passes through a supporting bar 31 and is tensioned by a nut 32. A locking screw 33 is arranged in a bore in the base to lock the chain tensioning device in the transport position.

Furthermore, the base 3 is screwed to an L-section mounting bracket 34, the arms 35, 36 of which project laterally beyond the base. In the narrow arm 36 there are bores 37 for fixing the chain tensioning device by screwing in the axial direction.

What is claimed is:

1. A chain tensioning device comprising
    base member means having a plurality of bores formed therethrough and a recess formed therein substantially perpendicular to said plurality of bores,
    tensioning head means adaptable for resilient movement toward and away from said base member means,
    a plurality of guide means each having first ends connected to said tensioning head means and second ends disposed within said plurality of bores of said base member means, and
    lever means disposed within said recess of said base member means movable therein in a direction opposite to the direction of movement of said tensioning head means.
2. A chain tensioning device as claimed in claim 1 comprising resilient means disposed in said lever means acting against a surface of said recess for causing said lever means to move said direction opposite to the movement of said tensioning head means.
3. A chain tensioning device as claimed in claim 1 comprising stop means disposed at outer extremities of said second ends of said guide means.
4. A chain tensioning device as claimed in claim 1 comprising pnuematic spring means connected between said base member means for providing uniform force therebetween.
5. A chain tensioning device as claimed in claim 4 wherein said pnuematic spring means is disposed substantially intermediate between said plurality of guide means.
6. A chain tensioning device as claimed in claim 1 comprising mounting bracket means secured to said base member means.
7. A chain tensioning device as claimed in claim 6 wherein said mounting bracket means is formed in the shape of an L-section and has arms extending laterally outwardly from said base member means.
8. A chain tensioning device comprising
    base member means having bore means formed therethrough and a recess formed therein substantially perpendicular to said bore means,
    tensioning head means adaptable for resilient movement toward and away from said base member means,
    pnuematic spring and guide means disposed within said bore means having a first end connected to said tensioning head means and a second end secured to said base member means providing uniform force therebetween, and
    lever means disposed in said recess of said base member means movable therein in a direction opposite to the direction of movement of said tensioning head means.
9. A chain tensioning device as claimed in claim 8 comprising resilient means disposed in said base member means acting against a surface of said lever means for causing said lever means to move in said direction opposite to the movement of said tensioning head means.

10. A chain tensioning device as claimed in claim 9 comprising adjustable locking means disposed in said base member means for at times placing the device in a locked position for purposes of transport.

11. A chain tensioning device as claimed in claim 9 wherein said pnuematic spring and guide means is restrained from rotation.

* * * * *